(12) United States Patent
Jiang et al.

(10) Patent No.: US 11,270,664 B2
(45) Date of Patent: Mar. 8, 2022

(54) USAGE MODE BASED DISPLAY POWER REDUCTION IN FOLDABLE ELECTRONIC DEVICES

(71) Applicant: Intel Corporation, Santa Clara, CA (US)

(72) Inventors: Jun Jiang, Hillsboro, CA (US); Michael Rosenzweig, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/800,980

(22) Filed: Feb. 25, 2020

(65) Prior Publication Data

US 2020/0402477 A1 Dec. 24, 2020

(51) Int. Cl.
*G06F 3/02* (2006.01)
*G09G 5/00* (2006.01)
*G09G 5/10* (2006.01)
*G06F 3/04886* (2022.01)
*G06F 3/01* (2006.01)

(52) U.S. Cl.
CPC .............. *G09G 5/10* (2013.01); *G06F 3/013* (2013.01); *G06F 3/04886* (2013.01); *G09G 2354/00* (2013.01); *G09G 2380/02* (2013.01)

(58) Field of Classification Search
CPC .... G06F 1/1626; G06F 1/1637; G06F 1/1643; G06F 1/1652; G06F 1/3231; G06F 1/3265; G06F 2203/04102; G06F 2203/04103; G06F 2203/04106; G06F 2203/04108; G06F 2203/04803; G06F 2203/04808; G06F 3/013; G06F 3/017; G06F 3/0346; G06F 3/041; G06F 3/0412; G06F 3/0482; G06F 3/0484; G06F 3/04842; G06F 3/04845; G06F 3/04847; G06F 3/0485; G06F 3/0486; G06F 3/0488; G06F 3/04883; G06F 3/04886; G09G 2330/022; G09G 5/00; Y02D 10/00; Y02D 30/50

See application file for complete search history.

(56) References Cited

U.S. PATENT DOCUMENTS

| | | | |
|---|---|---|---|
| 2011/0216064 A1* | 9/2011 | Dahl | G06F 1/1677 345/428 |
| 2012/0288139 A1 | 11/2012 | Singhar | |
| 2014/0375702 A1 | 12/2014 | Cho et al. | |
| 2015/0116364 A1 | 4/2015 | Aurongzeb et al. | |
| 2017/0003794 A1* | 1/2017 | Gao | G06F 1/1643 |
| 2018/0210508 A1 | 7/2018 | Aurongzeb et al. | |
| 2019/0250786 A1* | 8/2019 | Kwak | G06F 3/04842 |

OTHER PUBLICATIONS

Extended European Search Report dated Jun. 16, 2021 for European Patent Application No. 20215673.3, 8 pages.

* cited by examiner

*Primary Examiner* — Insa Sadio
(74) *Attorney, Agent, or Firm* — Schwabe, Williamson & Wyatt, P.C.

(57) ABSTRACT

The present disclosure is directed to a computing device including one or more processors and a foldable display. A non-transitory computer-readable medium stores a set of instructions that when executed by at least one processor of the one more processors cause the at least one processor to detect a usage mode of the foldable electronic device, detect user input to the foldable electronic device, and control a brightness of an active area on the display based on the detected usage mode and detected user input.

20 Claims, 11 Drawing Sheets

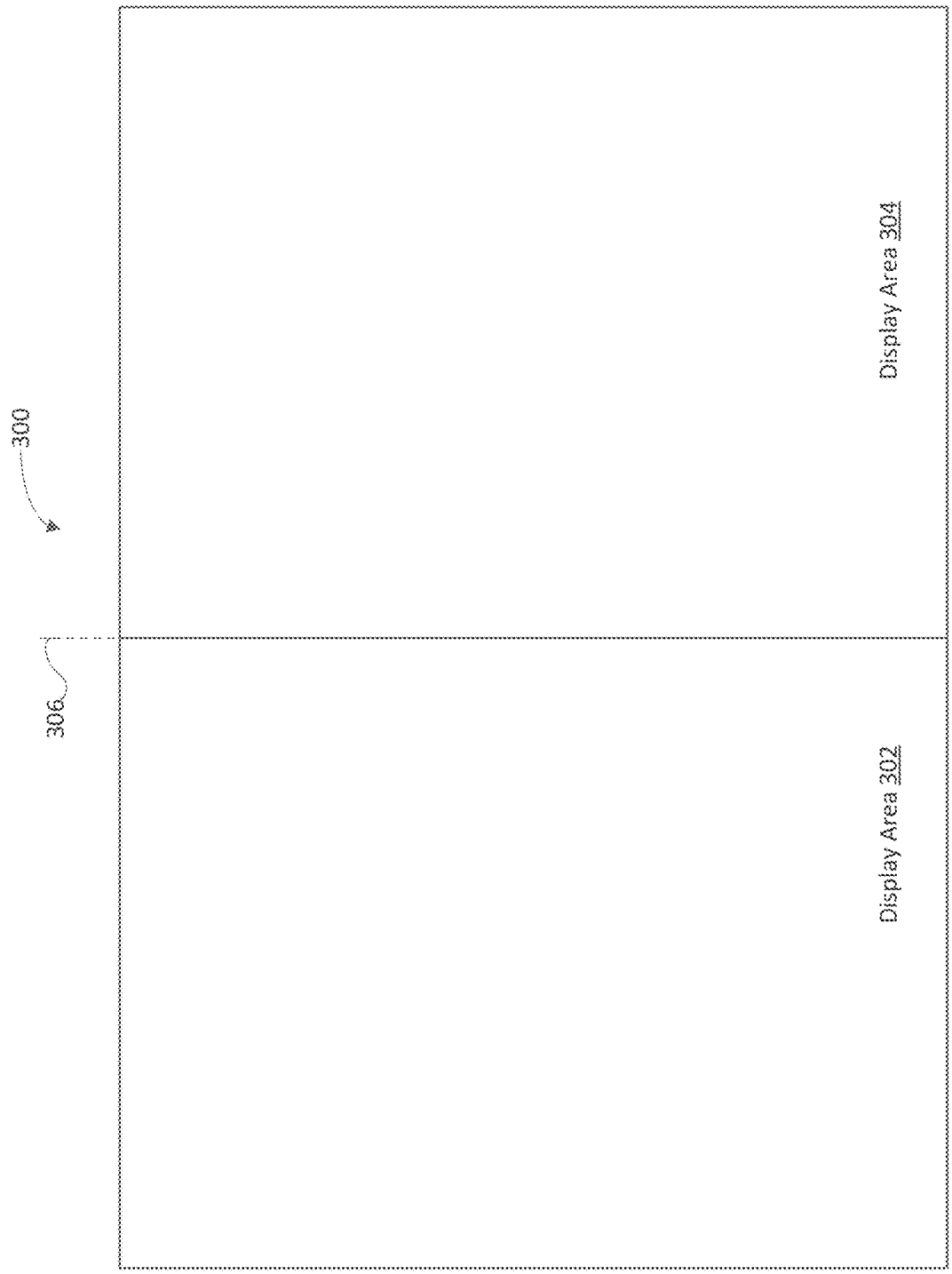

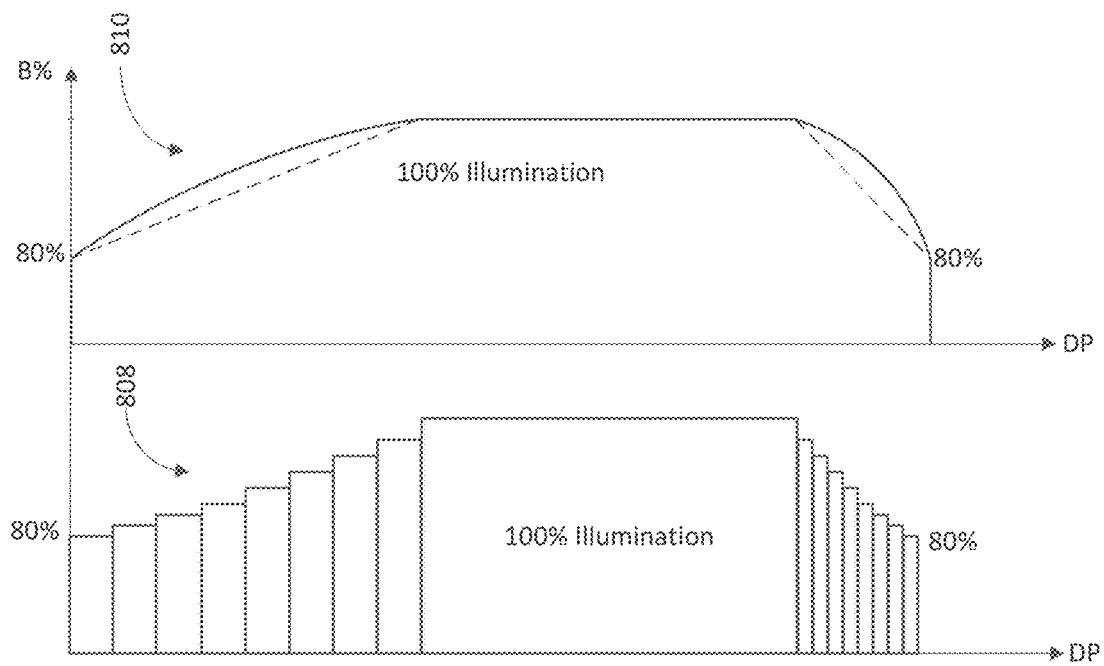
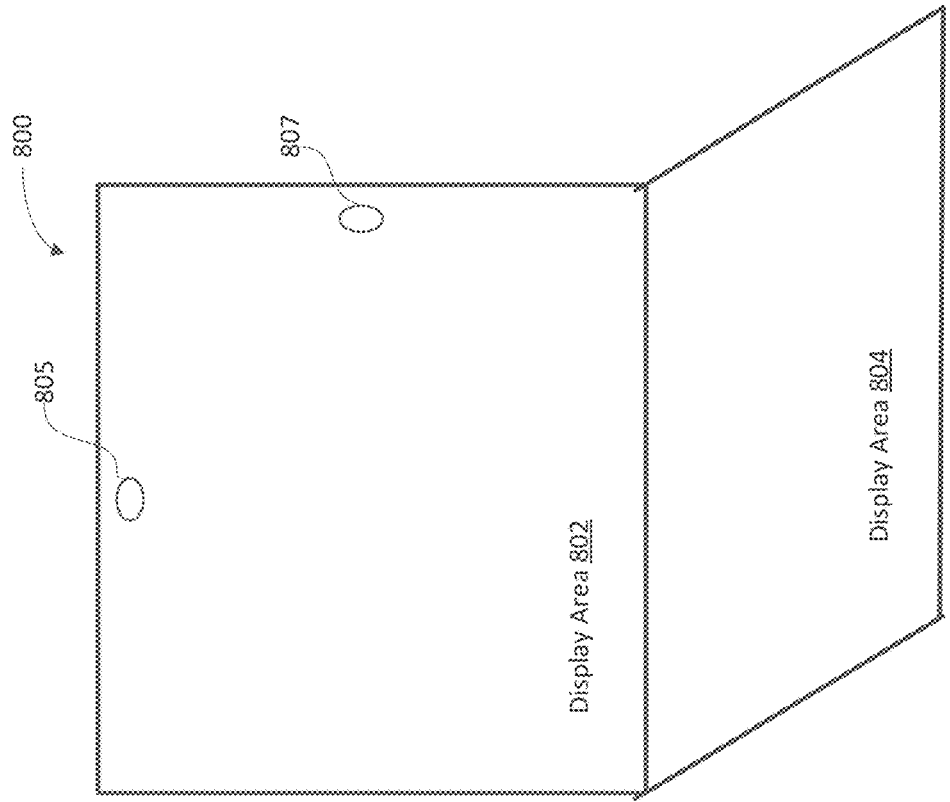
Figure 8C
Figure 8B
Figure 8A

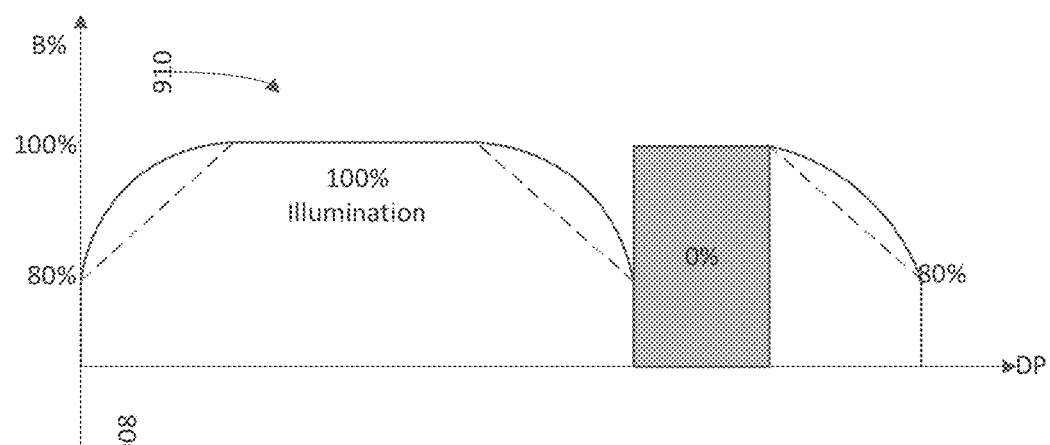
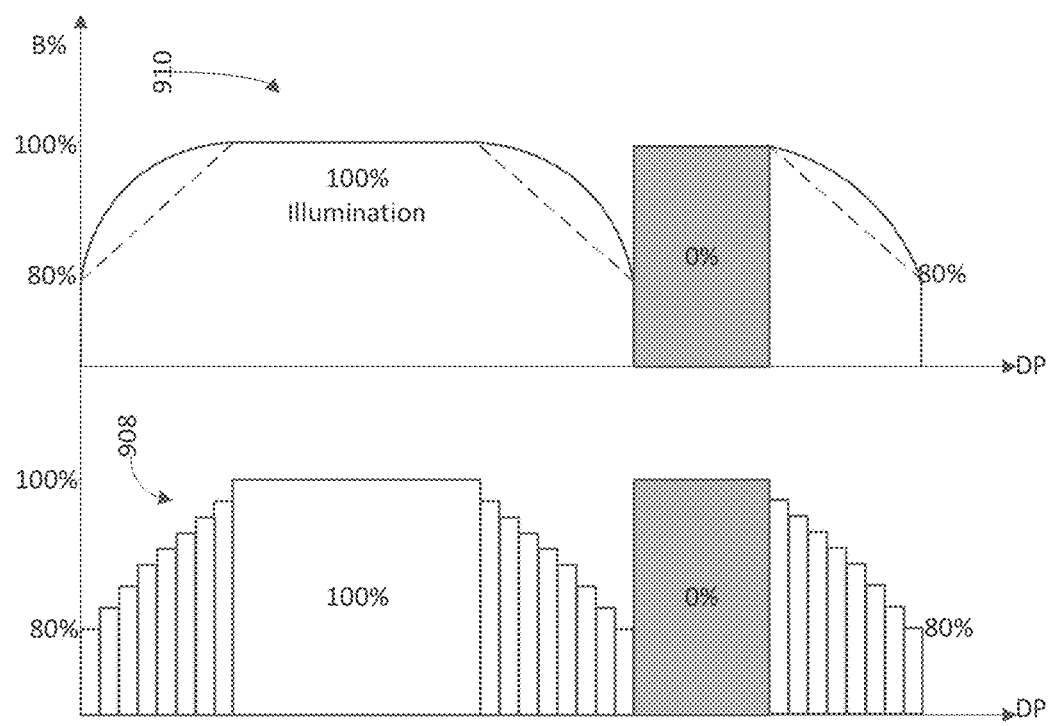
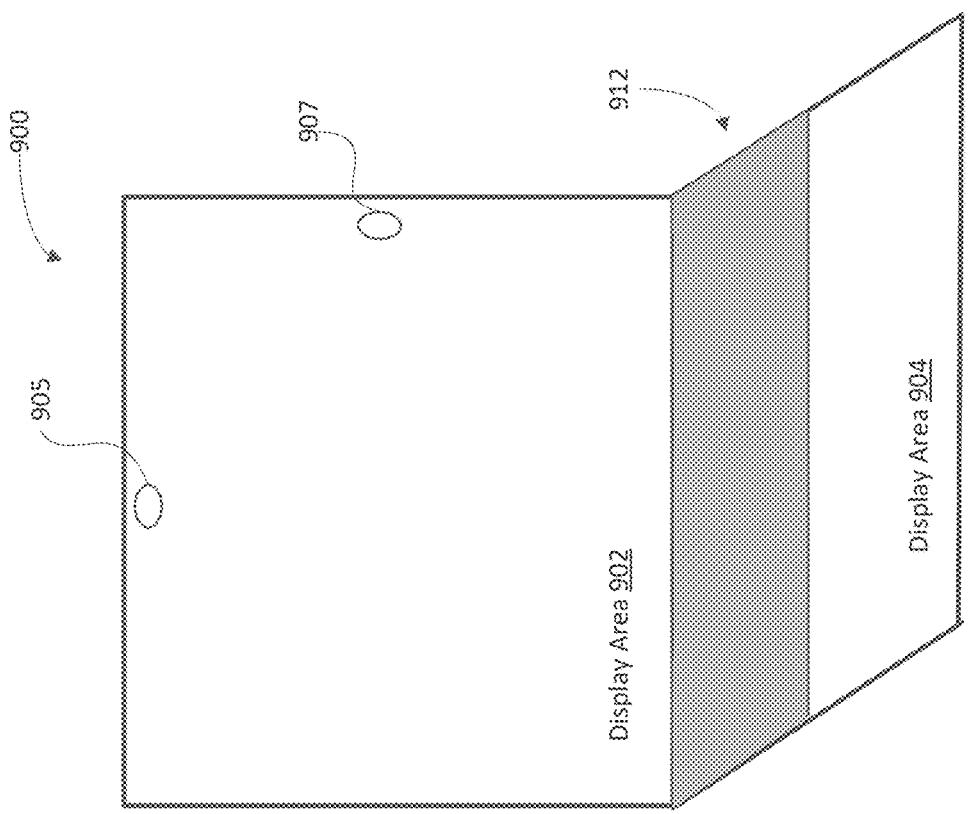
Figure 9C
Figure 9B
Figure 9A

USAGE MODE BASED DISPLAY POWER REDUCTION IN FOLDABLE ELECTRONIC DEVICES

BACKGROUND

The present disclosure relates to the reduction of power consumption in electronic devices, and more specifically to the reduction of electrical power consumed by displays in electronic devices including a foldable display.

In many electronic devices, such as laptop and notebook computers and mobile devices such as smart phones, a display of the electronic device is one of the highest power consuming components. These types of electronic devices are typically powered by battery power during use at least some of the time, and thus the high power consumption of the display reduces the battery life, where the battery life is the time for which the battery can power the electronic device. The power consumed by display components in an electronic device may be particularly high in foldable electronic devices, such as a foldable smart phone, phablet and tablet type devices. A foldable electronic device is a type of device that includes a display in which the device may folded to provide access to a smaller active area of the display and unfolded to provide access to a larger active area of the display. These foldable electronic devices are relatively new and may have a variety of configurations for the display. The Royole Flexpai, Huawei Mate X and Samsung Galaxy Fold are examples of foldable electronic devices. The term "foldable electronic device" is many times utilized as being synonymous with devices having a flexible display, but as used herein the term also includes devices having multiple smaller displays that may be folded and unfolded to provide access to smaller and larger active displays for the device.

When unfolded, the larger active display area of a foldable electronic device may have a large power consumption that greatly reduces battery life. In general, it would be advantageous to lower display power consumption and extend battery life in foldable electronic devices.

BRIEF DESCRIPTION OF THE DRAWINGS

FIG. 3 illustrates the size of an active display area of a foldable electronic device when folded and unfolded according to an embodiment.

FIGS. 8A-8C illustrate a usage mode based adaptive brightness control algorithm for an active display area including a virtual keyboard in a laptop mode of operation according to an embodiment.

FIGS. 9A-9C illustrate a usage mode based adaptive brightness control algorithm for an active display area and physical keyboard in a laptop mode of operation according to an embodiment.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
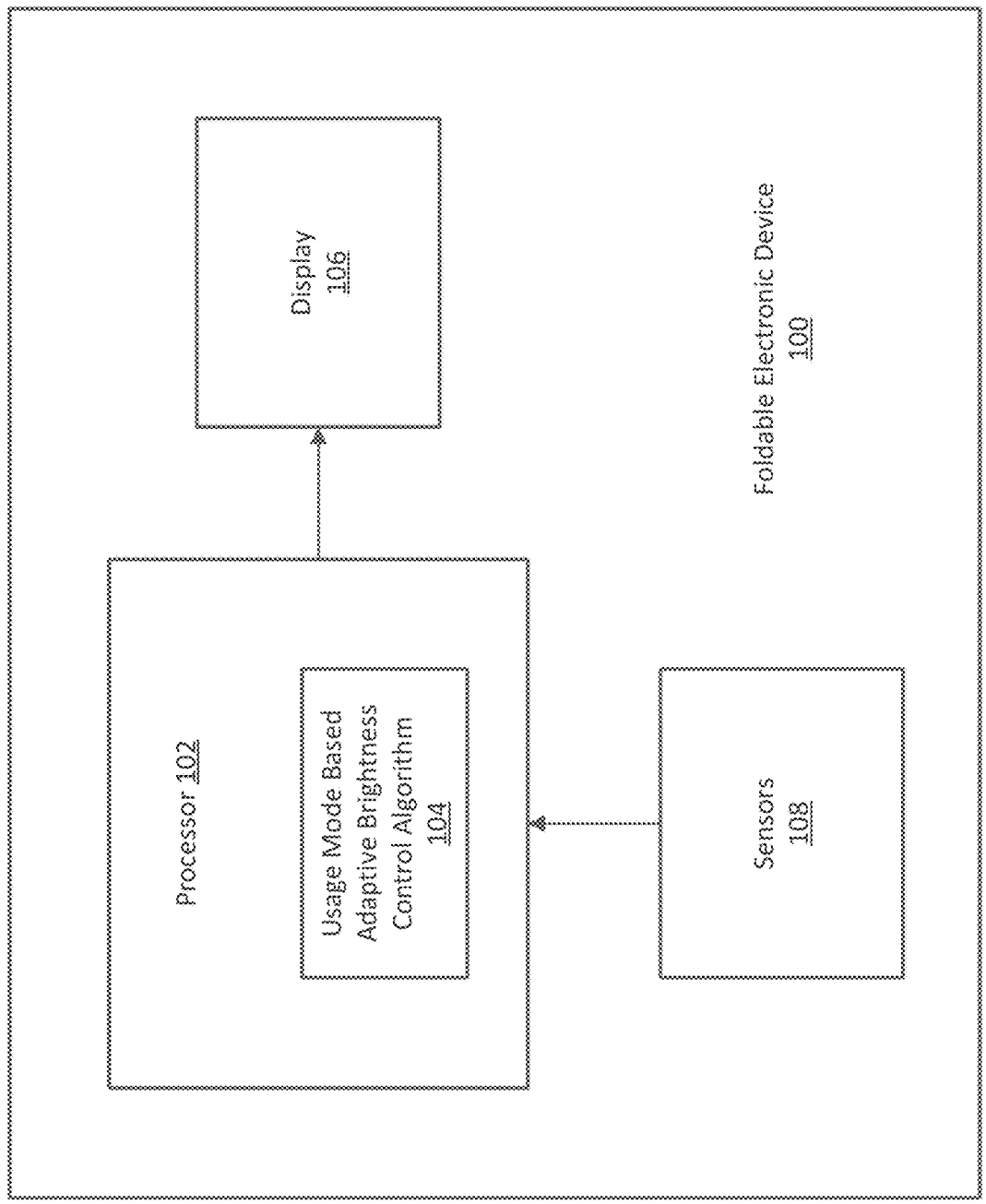
FIG. 1 is functional block diagram of a foldable electronic device including a usage mode based adaptive brightness control algorithm according to an embodiment.

FIG. 1 is a functional block diagram of a foldable electronic device 100 including a processor 102 that executes a usage mode based adaptive brightness control algorithm 104 to control brightness of a display 106 according to an embodiment. The usage mode based adaptive brightness control algorithm 104 controls the brightness of the display 106 based on a usage mode of the foldable electronic device 100 and other user inputs, such as eye attention or focus indicating where on the display a user is looking. Sensors 108 sense user inputs of the foldable electronic device 100 that are utilized by the usage mode based adaptive brightness control algorithm 104 to control brightness of the display and thereby lower the power consumption of the foldable electronic device, as will be explained in more detail below.

Figure 2:
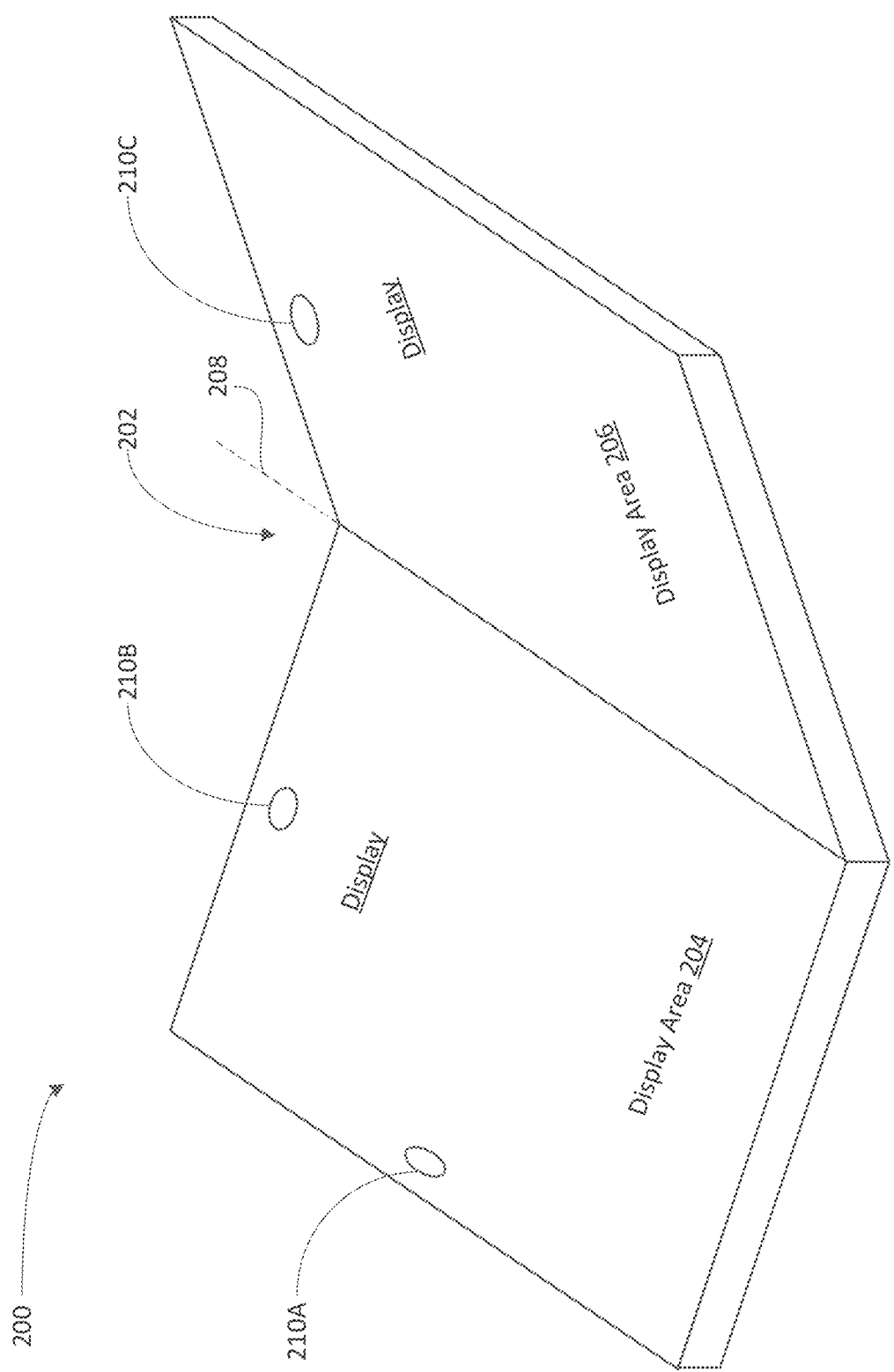
FIG. 2 is a perspective view of a foldable electronic device implementing a usage mode based adaptive brightness control algorithm according to an embodiment.

FIG. 2 is a perspective view of a foldable electronic device 200 implementing the usage mode based adaptive brightness control algorithm of FIG. 1 according to an embodiment. A display 202 of the foldable electronic device 200 includes two portions in the embodiment of FIG. 2, which are designated as display areas 204 and 206 in the figure. The foldable electronic device 200 is foldable along an axis 208, with the position of the two portions of the display 202 rotated about the axis 208 defining various usage modes of the device, as will be described in more detail below. Several cameras 210A-210C are positioned along edges of the two portions of the display 202, each of these cameras being utilized or not during operation in a corresponding usage mode of the device 200.

FIG. 3 illustrates a display 300 of a foldable electronic device including two display areas 302 and 304 like in the device 200 of FIG. 2. One or both of the display areas 302 and 304 may be active depending on the usage mode of the foldable electronic device. FIG. 3 illustrates that when the foldable electronic device is unfolded about an axis 306 as shown in the figure, both display areas 302 and 304 may be active. Conversely, when folded one display area 302 over the other display area 304 about the axis 306, only one of the display areas may be active. The size of an active display area of the foldable electronic device 300 doubles when unfolded compared to being folded, which approximately doubles the power consumed by the display 300. The size by which a battery in a foldable device may be increased is limited, and thus this doubled power consumption in usage modes where the display 300 is unfolded may unduly shorten the battery life of the device.

FIGS. 4A-4D illustrate several usage modes of a foldable electronic device according to various embodiments. Embodiments are described for a foldable electronic device that includes two display areas that may be folded or unfolded to varying degrees about an axis of rotation at which the two display areas are joined. The present disclosure is not limited embodiments including two only two display areas but may include three or more display areas in further embodiments. Neither are embodiments limited to including all the usage modes illustrated in FIGS. 4A-4D but may include additional usage modes or fewer than all the illustrated usage modes in further embodiments.

Figure 4A:
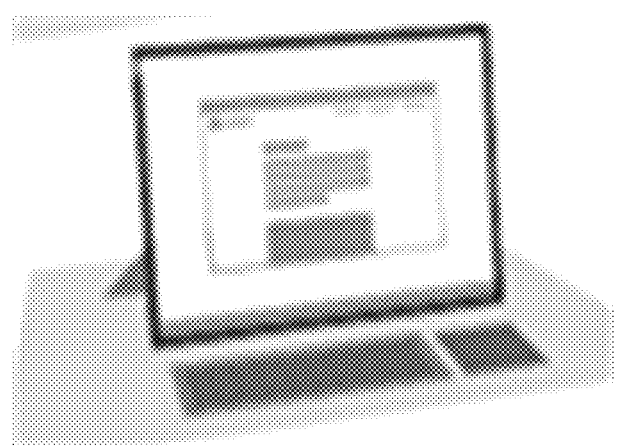
FIGS. 4A-4D illustrate several usage modes of a foldable electronic device according to various embodiments.
Figure 4B:
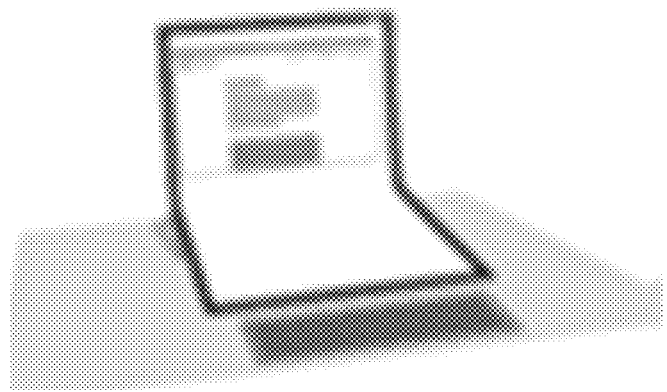
Figure 4C:
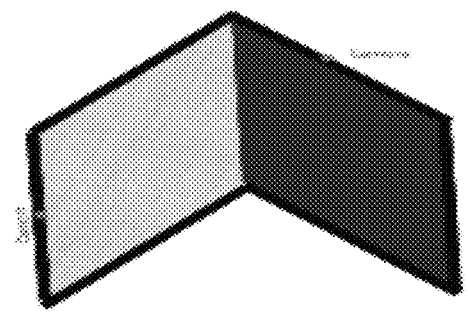
Figure 4D:
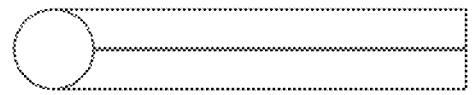

FIG. 4A illustrates a flat or unfolded usage mode of a foldable electronic device, such as may occur where the device is functioning as a tablet computer, or as a display or monitor along with a physical keyboard to form a laptop computing device. This is illustrated on the right in FIG. 4A. FIG. 4B illustrates a first folded usage mode of a foldable electronic device that will be referred to as a laptop usage mode in the present description. The laptop usage mode corresponds to the foldable electronic device being operated as a laptop computer including a virtual keyboard displayed on one of the two display areas, with the other display area functioning as the screen or monitor of the laptop. The laptop usage mode also includes the usage mode where the screen is folded inward and the user is holding the foldable electronic device as a person would when reading a book or newspaper. FIG. 4C illustrates a second folded usage mode of a foldable electronic device that is referred to as a tent usage mode in the present description. The tent usage mode corresponds to usage of the foldable electronic with the display folded outward as a dual display device where a user may face each display area of the device and view content being displayed on that display area. Finally, FIG. 4D illustrates a closed usage mode of the foldable electronic device in which each of the display areas is turned off. The display consumes no or very little power in the closed usage mode and thus this usage mode will not be further described herein.

Figure 5A:
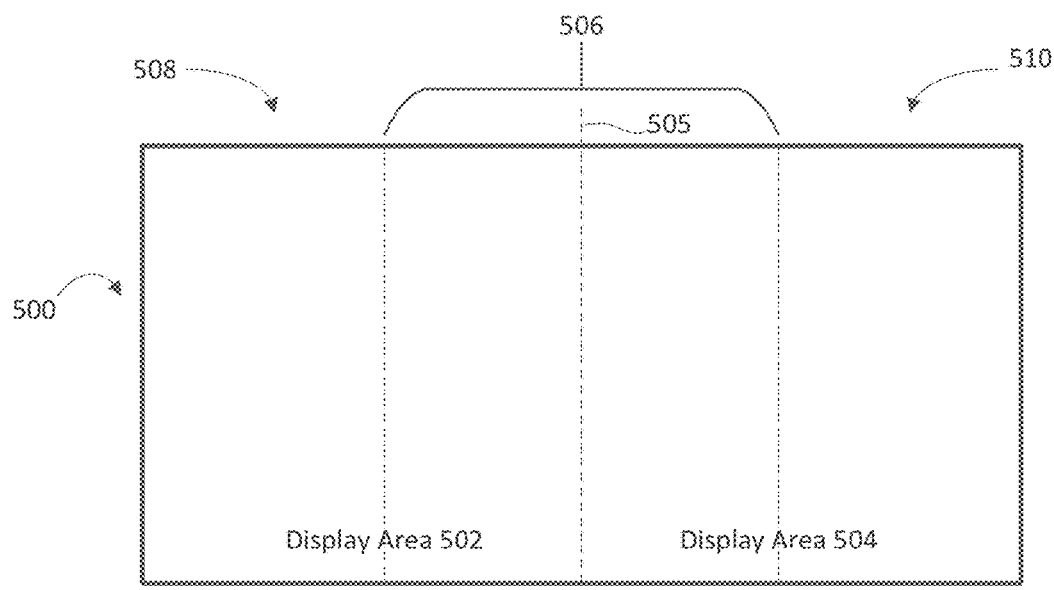
FIGS. 5A-5C illustrate a centered usage mode based adaptive brightness control algorithm for an active display area of a foldable electronic device according to various embodiments.
Figure 5B:
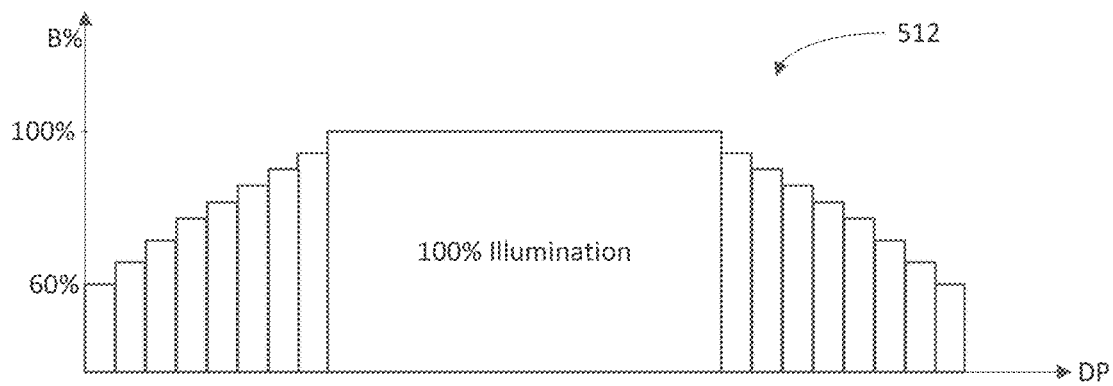
Figure 5C:
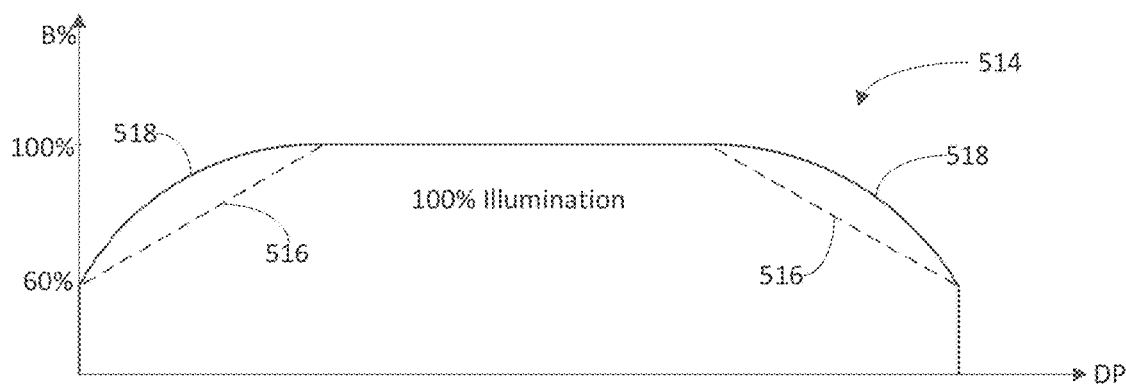

FIGS. 5A-5C illustrate a centered usage mode based adaptive brightness control algorithm for an active display area of a foldable electronic device according to various embodiments. FIG. 5A shows a display 500 of a foldable electronic device in the unfolded usage mode of FIG. 4A according to one embodiment. The display 500 includes first and second display areas 502, 504 on the left and right halves. These display areas 502 and 504 rotate about an axis 505. A center or focus area 506 is in the center of the display 500 as shown, with non-focus areas 508 and 510 around the focus area on the left and right sides of the focus area in this embodiment.

FIG. 5B illustrates a dimming profile 512 implemented by the centered usage mode based adaptive brightness control algorithm on the display 500 in this example embodiment. The vertical axis of the profile 512 illustrates the percentage illumination or brightness B (B %) at a given display position DP on the active areas 502, 504 of the display 500. The zero-display position DP corresponds to the left side of the display 500 while the display position DP on the right side of the profile 512 corresponds to the right side of the display. In this embodiment, a user's eyes are assumed to be looking at or focused on the focus area 506 in the center of the display 500. As a result, the brightness B is maintained at 100% for the content being displayed in the focus area 506. In the non-focus areas 508 and 510, the brightness B is gradually decreased from 100% at inner sides of these non-focus areas adjoining the focus area 506 to a lower percentage on the outer sides of the non-focus areas (i.e., on the left and right sides of the display 500). In the illustrated example, the brightness B is reduced or dimmed to 60% on the outer sides of the non-focus areas 508, 510.

In the example of FIG. 5B, decreasing the brightness B in the non-focus areas 508, 510 decreases a brightness of groups of pixels from the inner side to the outer side of each of these non-focus areas. This approach could be utilized, for example, where the display 500 is a liquid crystal display (LCD) having segmented backlighting. The horizontal width along the display position DP axis represents a segment of the backlighting of the display 500 where the display is an LCD.

Dimming or reducing the brightness B of groups of pixels in the display 500 in this way may result in undesirable banding on the display in the non-focus areas 508, 510. This banding may be unacceptable to some users. FIG. 5C illustrates a dimming profile 514 implemented by the centered usage mode based adaptive brightness control algorithm on the display 500 where the display may be controlled at the pixel level, such as in light emitting diode (LED) or organic light emitting diode (OLED) types of displays. Where the display 500 is an LED or OLED display, the display includes an array of pixels arranged in rows and columns. The dimming profile 514 gradually dims columns of pixels in the non-focus areas 508, 510 from 100% adjoining the focus area 506 to a reduced brightness percentage at the outer edges of the non-focus areas, which is 60% in the illustrated example.

The brightness B in the non-focus areas 508, 510 may be linearly decreased as illustrated by the dashed lines 516 in FIG. 5C or may be decreased through some other relation as a function of display position DP, as illustrated by curves 518. In the unfolded usage mode of a foldable display 500 as illustrated in FIGS. 5A-5C, the display has a larger field of view (FOV) that extends across a user's FOV. The human eye has a higher sensitivity in the center of the eye's FOV, and this sensitivity decreases at points away from the from the center the user's FOV to points on a periphery of the user's FOV. The embodiment of FIGS. 5A-5C takes advantage of this sensitivity change in a user's FOV.

Figure 6A:
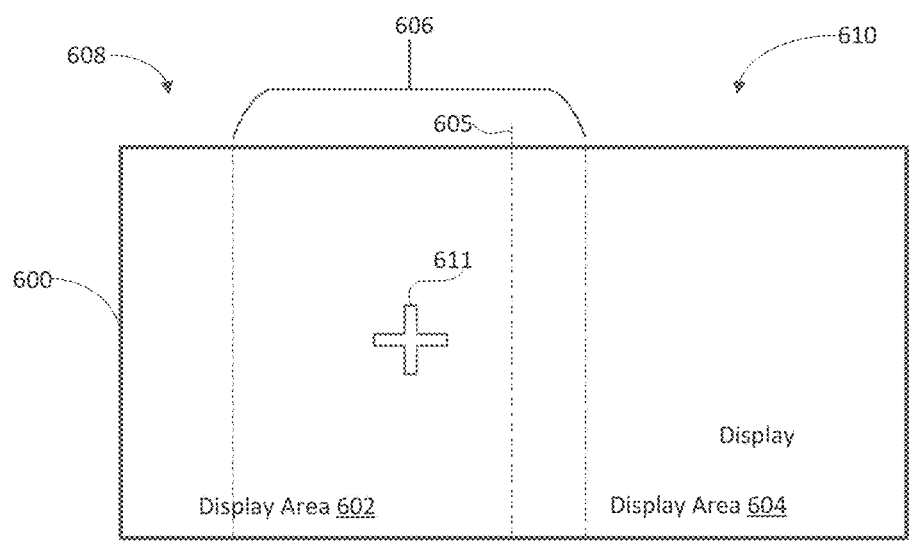
FIGS. 6A-6C illustrate an eye detection usage mode based adaptive brightness control algorithm for an active display area of a foldable electronic device according to various embodiments.
Figure 6B:
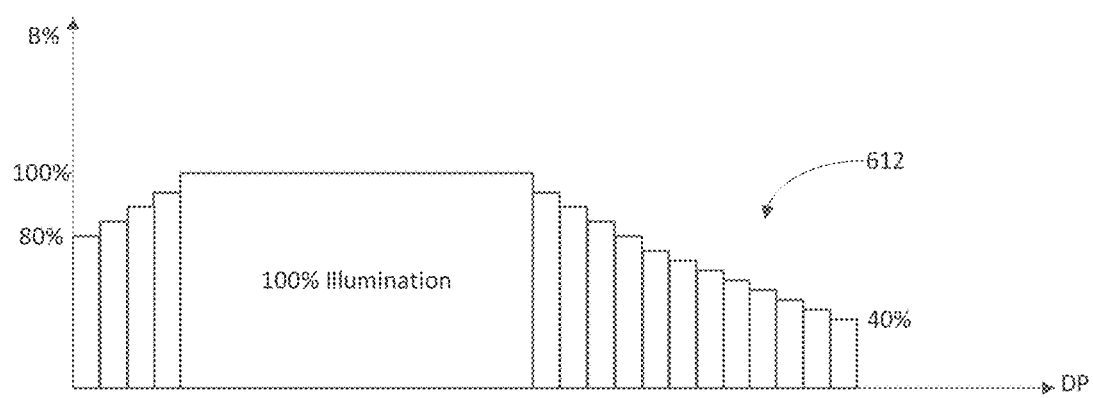
Figure 6C:
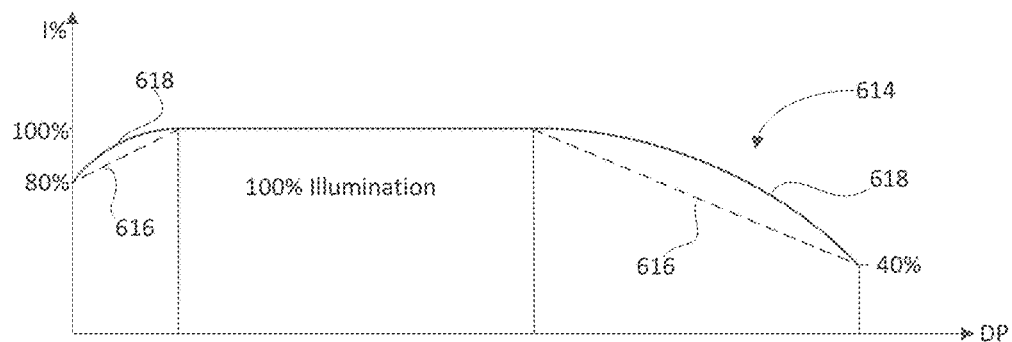

FIGS. 6A-6C illustrate an eye detection usage mode based adaptive brightness control algorithm for a display 600 of a foldable electronic device according to various embodiments. The display 600 includes first and second display areas 602, 604 that may be folded and unfolded about an axis 605. Once again, a focus area 606 and non-focus areas 608, 610 on the display 600 are identified. In the embodiment of FIGS. 6A-6C, however, the focus area 606 is detected based on an eye position or eye movement instead of being placed in the center of the display as in the embodiment of FIGS. 5A-5C. The eye gaze or position of the user's eyes in the example of FIG. 6A is represented through a cross 611 as shown in the center of the focus area 606. Thus, in this embodiment the location of the user's gaze on the display 600 (i.e., where the user is looking on the display 600) is detected and the focus area 606 is thereafter determined around this detected location of the user's gaze.

FIG. 6B illustrates a dimming profile 612 implemented by the eye detection usage mode based adaptive brightness control algorithm on the display 600 in this example embodiment. In this embodiment, the brightness B is maintained at 100% for the determined focus area 606, which is determined based on the detected user eye position as represented by cross 611. Thus, the brightness B is maintained at 100% for the content being displayed in the focus area 606. In the non-focus areas 608, 610, the brightness B is gradually decreased from 100% at inner sides of these non-focus areas adjoining the focus area 606 to a lower percentage on the outer sides of the non-focus areas (i.e., on the left and right sides of the display 500).

Because the focus area 606 is no longer centered on the display 600, the dimming in the non-focus areas 608, 610 is not symmetric in this embodiment. In the illustrated example, the focus area 606 is positioned closer to the left side of the display 600. As a result, the non-focus area 608 to the left of the focus area 606 is smaller than the non-focus area 610 to the right of the focus area. If the change in brightness B from the inner side of the non-focus area 608 adjoining the focus area 606 to the outer side of this non-focus area (i.e., the change of the brightness B over the non-focus area) is too large, this variation may be undesirably perceived by the user. Accordingly, in the embodiment of FIGS. 6A-6C, the change in brightness B over the smaller non-focus area 608 is different than the change over the larger non-focus area 610. As seen in FIG. 6B, the brightness B is decreased from 100% at the inner side of the non-focus area 608 adjoining the focus area 606 to 80% at the outer side of this non-focus area on the left side of the display 600. The larger non-focus area 610 has the brightness B decreased from 100% at the inner side of the non-focus area 610 adjoining the focus area 606 to 40% at the outer side of this non-focus area on the right side of the display 600. Thus, the total change in brightness across the smaller non-focus area 608 is less than the total change in brightness across the larger non-focus area 610. The dimming or change in brightness in the non-focus areas 608, 610 is thus not symmetric in this embodiment. Due to the larger size of the non-focus area 610, although the total change in brightness B across this non-focus area is greater than for the smaller non-focus area 608, the gradient or rate of change of the brightness B may be smaller for this non-focus area and thus be less likely to be undesirably perceived by the user.

In the example of FIG. 6B, the dimming profile 612 decreases in an asymmetric way the brightness B across the non-focus areas 608, 610 of groups of pixels from the inner side to the outer side of each of these non-focus areas as previously discussed with reference to FIG. 5B. FIG. 6C illustrates a dimming profile 614 implemented by the eye detection usage mode based adaptive brightness control algorithm on the display 600 where the display may be controlled at the pixel level, such as in LED or OLED types of displays. The dimming profile 614 gradually dims columns of pixels asymmetrically in the non-focus areas 608, 610. For the non-focus area 608, the profile 614 dims the brightness B from 100% adjoining the focus area 606 to a reduced brightness percentage of 80% at the outer edge of the non-focus area corresponding to the left side of the display 600. This dimming may be done either linearly as illustrated by the dashed line 616 or may be decreased through some other relation as a function of display position DP, as illustrated by curve 618. For the non-focus area 610, the profile 614 dims the brightness B from 100% adjoining the focus area 606 to a reduced brightness percentage of 40% at the outer edge of the non-focus area corresponding to the right side of the display 600. Once again, this dimming may be done linearly as illustrated by dashed line 616 or through some other relation as a function of display position DP as shown by curve 618.

Figure 7A:
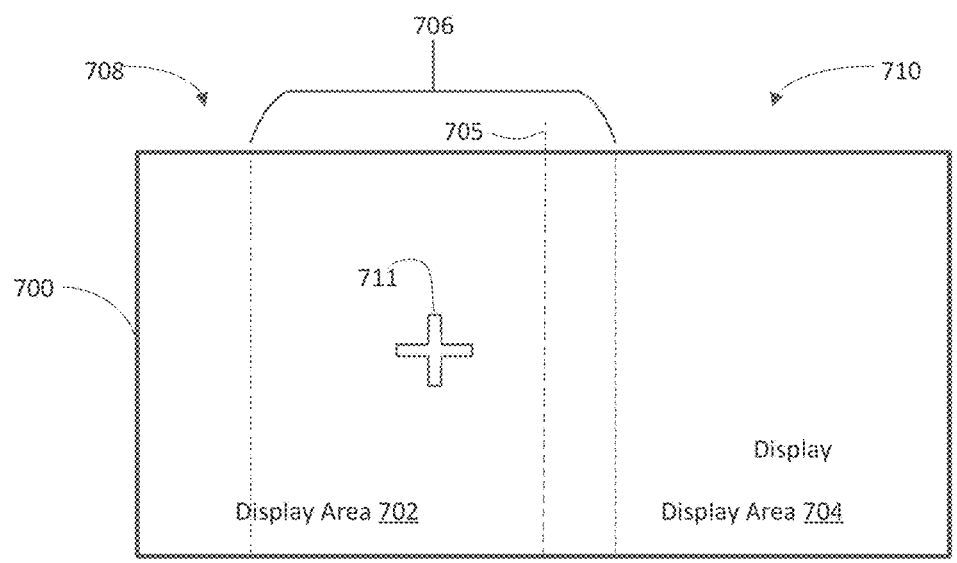
FIGS. 7A-7C illustrate a symmetric eye detection usage based adaptive brightness control algorithm for an active display area of a foldable electronic device according to various embodiments.
Figure 7B:
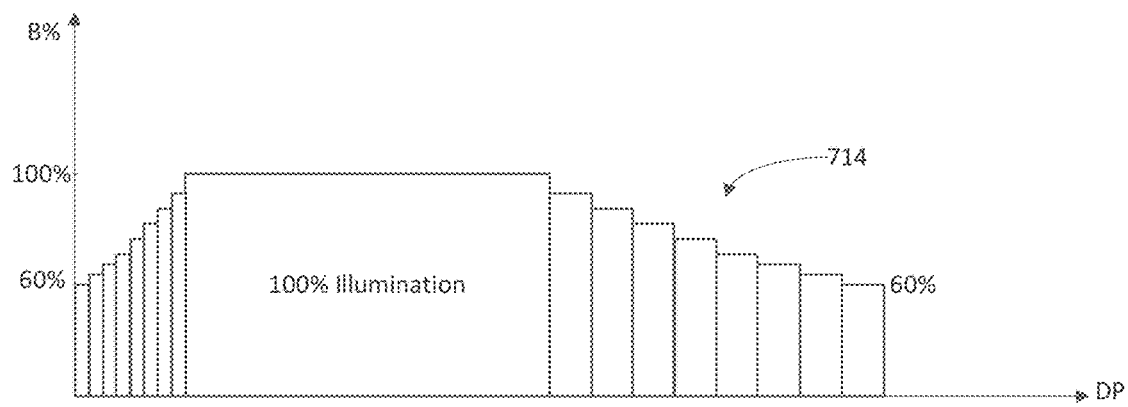
Figure 7C:
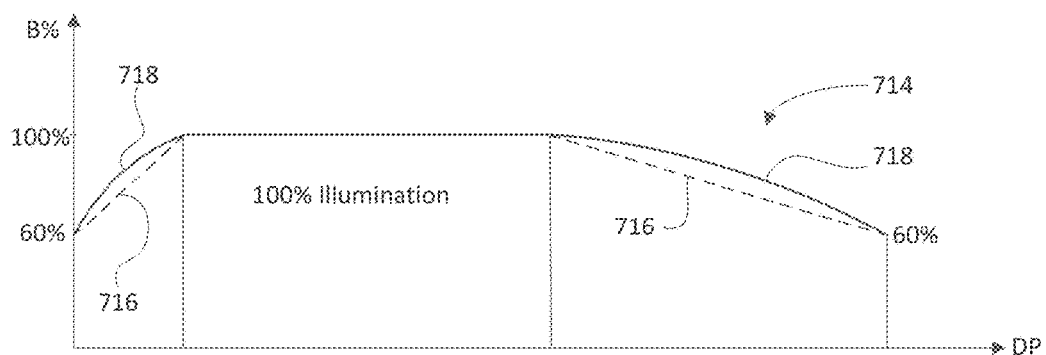

FIGS. 7A-7C illustrate a variable zone eye detection usage based adaptive brightness control algorithm for a display 700 of a foldable electronic device according to various embodiments. The variable zone symmetric eye detection usage based adaptive brightness control algorithm is similar to the brightness control algorithm described with reference to FIGS. 6A-6C. The features 700-718 are similar to the corresponding features 600-618 in FIGS. 6A-6C and will not again be described in detail with reference to FIGS. 7A-7C. In the approach of FIG. 7B, the dimming profile 712 for the non-focus areas 702 and 704 is symmetric in terms of the change of brightness over each of these non-focus areas, but the sizes of groups of pixels being dimmed are different in the two non-focus areas 702 and 704. Once again, as shown in FIG. 7C the dimming may be done linearly as illustrated by dashed line 716 or through some other relation as a function of display position DP as shown by curve 718.

FIGS. 8A-8C illustrate a usage mode based adaptive brightness control algorithm for a display 800 including a virtual keyboard in one of a display area 802, 804 in a laptop mode of operation according to an embodiment. Two cameras 805 and 807 are included in display area 802 as shown, and dimming is based on user eye detection as previously described for the embodiments of FIGS. 6A-6C and 7A-7C. Dimming profiles 808 and 810 as shown in FIGS. 8B and 8C may be used for this mode of operation. In this embodiment, the foldable electronic device including the display 800 is operating in the laptop mode with a virtual keyboard (not shown) displayed in the display area 804. The keys of the virtual keyboard may be presented on the display area 804 with a high contrast ratio while the brightness B of these keys may be kept relatively low. In this way, an on pixel ratio (OPR) in the display area 804 may be reduced, reducing the power consumption of this display area.

FIGS. 9A-9C illustrate a usage mode based adaptive brightness control algorithm for a display 900 where a physical keyboard is used in a laptop mode of operation according to an embodiment. Two cameras 905 and 907 are included in display area 902 as shown, and dimming once again may be based on user eye detection as previously described. Dimming profiles 908 and 910 as shown in FIGS. 9B and 9C may be used for this mode of operation. In this embodiment, the foldable electronic device including the display 900 is operating in the laptop mode with a physical keyboard 912 in the display area 904. In this example, the physical keyboard is placed on the display area 904 as illustrated. Sensors in the foldable electronic device including the display 900 detect the utilization of the physical keyboard and in this situation the display areas 902 and 904 are dimmed according to dimming profiles 908 and 910 as seen in FIGS. 9B and 9C. In each of these dimming profiles 908, 910 the portion of the display area 904 over which the physical keyboard is placed is turned OFF (i.e., pixels are black in this portion) to thereby lower the power consumption of this display area.

Referring back to FIG. 4C, another usage mode for the tent usage mode will now be described in more detail. In the tent usage mode, the foldable display is folded outward as a dual display device where a separate user may face each display area of the device and view content being displayed on that display area. The tent usage mode effectively provides a split screen that enables two users sitting across from one another to interact with the foldable electronic device through the respective display areas. In this situation, the foldable device includes sensors, such as a camera, in each display area to detect human presence proximate each of the display areas. When there is no human presence detected proximate a display area, the corresponding display area of the display will be turned OFF or put into sleep mode to reduce power consumption of the foldable electronic device.

Figure 10:
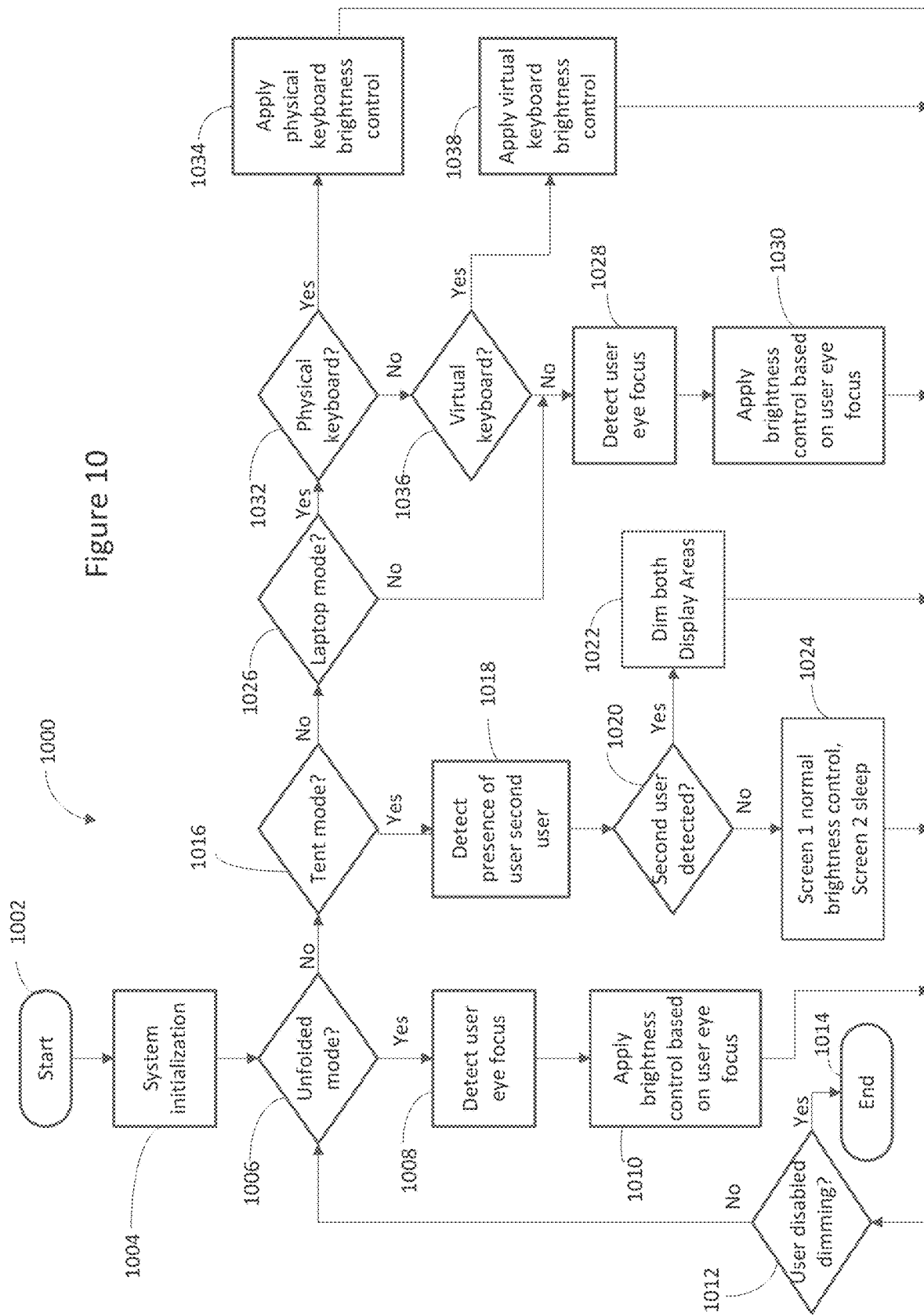
FIG. 10 is a flowchart of a usage mode based adaptive brightness control algorithm according various embodiments.

FIG. 10 is a flowchart of a usage mode based adaptive brightness control process 1000 according to various embodiments. The process 1000 begins at 1002 and proceeds to 1004 where the foldable electronic device implementing the process 1000 is initialized and the process then proceeds to 1006. At 1006, the process 1000 determines, through suitable sensors in the foldable electronic device as previously discussed with reference to FIG. 1, whether the foldable electronic device is operating in the unfolded mode (FIG. 4A). If the determination at 1006 is positive, the process 1000 proceeds to 1008 and detects, once again through suitable sensors in the foldable electronic device, the eye focus of the user on the display of the foldable electronic device (i.e., where is the user looking on the display). After 1008, the process 1000 proceeds to 1010 and applies a brightness control algorithm based on the eye focus of the user, such as the algorithms described with reference to FIGS. 6-8.

At 1012, the process 1000 and determines whether the user has manually disabled dimming control of the display of the foldable electronic device. For example, although the battery of the electronic device may be low, the user may know that he or she can quickly finish a desired task on the device before the battery runs out and would like to do so without brightness control on the display being implemented. If the determination at 1012 is positive, the process 1000 proceeds to 1014 and ends, implementing no brightness control or dimming on the display of the foldable electronic device. When the determination at 1012 is negative, the process 1000 returns to 1006 and again determines whether the foldable electronic device is operating in the unfolded usage mode.

If the determination at 1006 is negative, the process 1000 proceeds to 1016 and determines, through suitable sensors in the foldable electronic device, whether the foldable electronic device is operating in the tent usage mode (FIG. 4C). When the determination at 1016 is positive, the process 1000 proceeds to 1018 and determines whether a user is present proximate a second display area of the display of the foldable electronic device. In this embodiment, a user is assumed to be proximate a first display area of the display. From 1018 the process 1000 proceeds to 1020 and determines whether a user has been detected proximate the second display area. When the determination at 1020 is positive, the process 1000 proceeds to 1022 and dimming or brightness control according to one of the previously described algorithms is implemented on both the first and second display areas of the display. From 1022, the process 1000 again proceeds back to 1012. If the determination at 1020 is negative, indicating no user has been detected proximate the second display area, the process 1000 proceeds to 1024 and brightness control according to one of the previously described algorithms is implemented on the first display area while the second display area is turned OFF to lower power consumption. From 1024 the process 1000 again proceeds back to 1012.

When the determination at 1016 is negative, the process 1000 proceeds to 1026 and determines, through suitable sensors, whether the foldable electronic device is operating in the laptop mode. If the determination at 1026 is negative, the process 1000 proceeds to 1028 and detects eye focus of the user and thereafter at 1030 applies brightness control on the display of the foldable electronic device according to one of the previously described brightness control algorithms. From 1030, the process 1000 proceeds back to 1012.

When the determination at 1026 is positive, indicating the foldable electronic device is operating in the laptop usage mode, the process 1000 proceeds to 1032 and determines whether a physical keyboard is being utilized with the foldable electronic device. If the determination at 1032 is positive, the process 1000 proceeds to 1034 and applies a brightness control algorithm such as that described above with reference to FIGS. 9A-9C to dim the display and thereby lower the power consumption of the foldable electronic device in this usage mode. From 1034, the process 1000 proceeds back to 1012.

If the determination at 1032 is negative, the process 1000 proceeds to 1036 and determines whether a virtual keyboard is being utilized in one of the first and second display areas of the display of the foldable electronic device. When the determination at 1036 is positive, the process 1000 proceeds to 1038 and applies a brightness control algorithm such as that described above with reference to FIGS. 8A-8C to dim the display and thereby lower the power consumption of the foldable electronic device in this usage mode. From 1038, the process 1000 proceeds back to 1012. If the determination at 1036 is negative, the process 1000 proceeds to 1028 and detects, once again through suitable sensors in the foldable electronic device, the eye focus of the user on the display of the foldable electronic device (i.e., where is the user looking on the display). After 1028 the process 1000 proceeds to 1030 and applies a brightness control algorithm based on the eye focus of the user, such as the algorithms described above with reference to FIGS. 6-8. From 1030 the process 1000 again returns to 1012.

Figure 11:
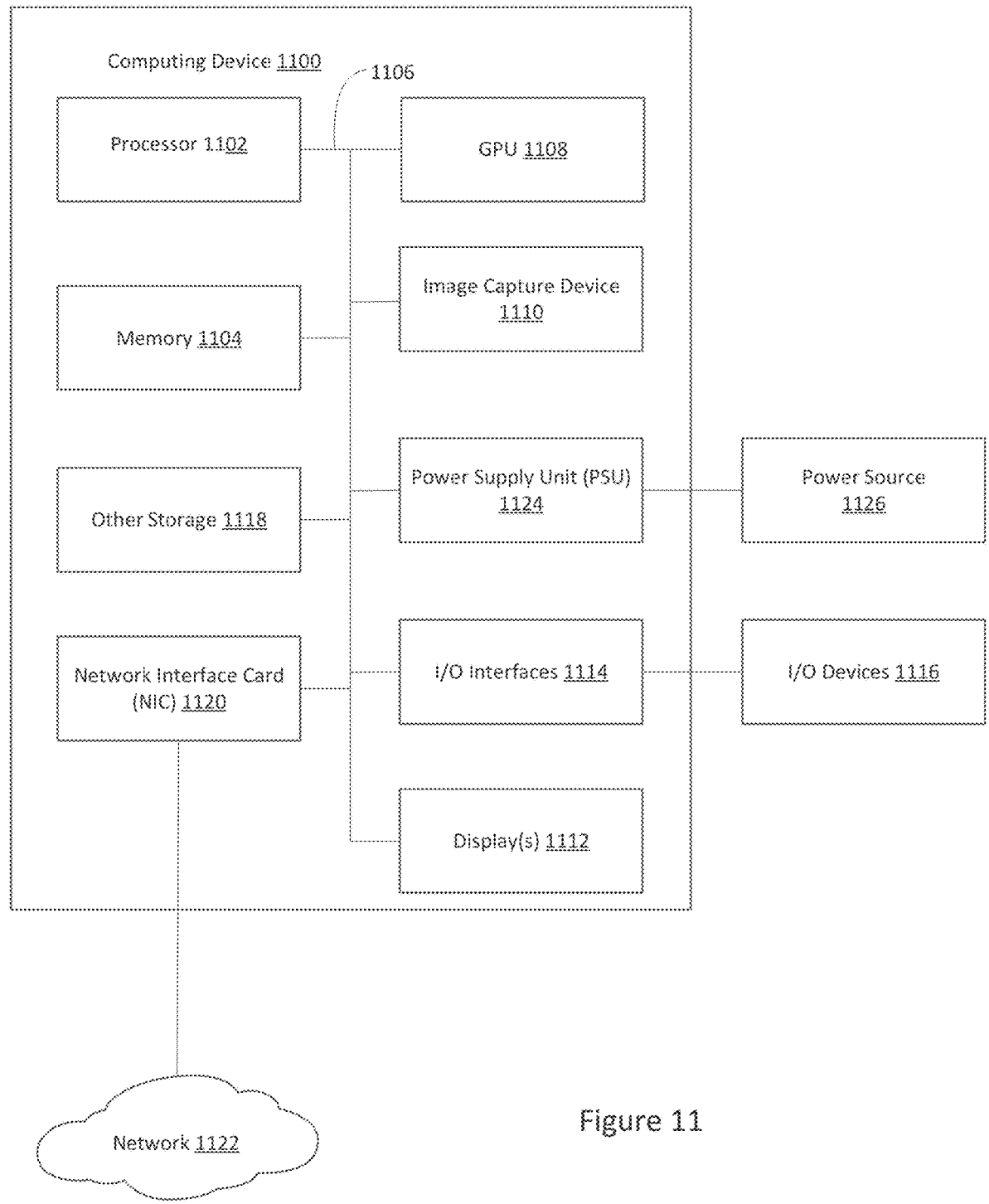
FIG. 11 is a functional block diagram of a computing device illustrating a sample environment in which a usage mode based adaptive brightness control algorithm may be implemented according to an embodiment.

FIG. 11 is a functional block diagram illustrating an example of a computing device 1100 to implement brightness control algorithms discussed herein with reference to the embodiments of FIGS. 1-10. The computing device 1100 may be, for example, a foldable mobile device such as a smart phone, phablet, or tablet computer, or other type of computing device that would benefit from the power savings provided by the usage mode based brightness control algorithms of the present application. The computing device 1100 would typically be a mobile device running on battery power, which would then utilize the brightness control techniques of the present application to extend the life of battery for a given charge by lowering the power consumption of the system. The computing device 1100 need not be a mobile device, however, where there is a need to reduce the power consumption of the system even though the device is not being powered through battery power. Finally, the computing device 1100 of FIG. 11 illustrates an example of a suitable computing system environment in which embodiments of the present disclosure may be implemented. The computing device 1100 is an example of one suitable computing environment and should not be considered to suggest any limitation as to the implementations of embodiments of the present disclosure.

In the example embodiment of FIG. 11, the computing device 1100 includes a processor 1102, such as a central processing unit, which is configured to execute stored instructions. A memory device 1104 stores instructions that are executable by the processor 1102, and may be any suitable type of memory such as read only memory (ROM), dynamic random access memory (DRAM), static random access memory (SRAM), flash memory (FLASH), or a combination these and other different types of memory. The memory device 1104 stores instructions executed by the processor 1102, including instructions of OS and graphics driver GD loaded into memory, and instructions executed by the processor to implement the display power-reduction processes of FIGS. 1-7. The processor 1102 is coupled to the memory device 1104 through a bus 1106 of the computing device 1100. The processor 1102 may be a single core processor, a multi-core processor, a computing cluster, or any number of other configurations. Furthermore, the computing device 1100 may include more than one processor 1102 and more than one memory device 1104.

The computing device 1100 further includes a graphics processing unit (GPU) 1108, and the processor 1102 is coupled through the bus 1106 to the GPU. The GPU 1108 performs any number of graphics functions and actions within the computing device 1100, such as rendering or manipulating graphics images, graphics frames, videos, or the like, to be displayed to a user of the computing device 1100. An image capture device 1110, such as a camera, scanner, infrared sensor, or other type of suitable device, is also coupled to the bus 1106 to communicate with the processor 1102 and memory device 1104. The processor 1102 is coupled through the bus 1106 to one or more displays 1112, which may include displays that are internal to or "built-in" component of the computing device 1100. The displays 1112 include a foldable display or multiple individual displays that collectively function as an overall display of the computing device 1100.

The processor 1102 is also be connected through the bus 1106 to an input/output (I/O) interface 1114 configured to connect the computing device 1100 to one or more I/O devices 1116. The I/O devices 1116 may include, for example, a keyboard, a pointing device such as a touchpad or a touchscreen, a storage device, and other types of electronic devices. The I/O devices 1116 may include built-in components of the computing device 1100 or may be devices that are externally connected to the computing system. In some cases, the I/O devices 1116 are touchscreen devices integrated within a display device, such as one or more of the display devices 1112.

The computing device 1100 may also include another storage device or devices 1118, which may include a physical memory such as a hard drive, an optical drive, a thumb drive, an array of drives, or any combinations thereof. The storage device 1118 may also include remote storage drives. A network interface controller (NIC) 1120 connects the computing device 1100 to a network 1122, which may be a wide area network (WAN), local area network (LAN), the Internet, or the like. The computing device 1100 is powered through a power supply unit (PSU) 1124 that communicates with the processor 1102 through the bus 1106 to communicate control signals or status signals to the PSU. The PSU 1124 includes a rechargeable power source such as a battery in some embodiments, and is coupled to a power source 1126 external the computing device 1100 to receive electrical power, charge the rechargeable power source when present, and to supply provide electrical power to the other components in the computing device 1100. The block diagram of FIG. 11 is not intended to indicate that the computing device 1100 must include all the components shown. Furthermore, the computing device 1100 may include any number of additional components not shown in FIG. 11 based on the specific implementation or utilization of the computing system.

The various features and processes described above may be used independently of one another or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

ADDITIONAL EXAMPLES

Each of the following non-limiting examples may stand on its own or may be combined in various permutations or combinations with one or more of the other examples.

Example 1 is a method, comprising: detecting a usage mode of a foldable electronic device including a display; detecting user input to the foldable electronic device; and controlling a brightness of an active area on the display based on the detected usage mode and detected user input.

Example 2 is the subject matter of Example 1, wherein detecting user input comprises detecting at least one of: detecting eye focus of a user; detecting a presence of one or more users proximate the foldable electronic device; detecting whether a keyboard is to be used to interface with the foldable electronic device; or detecting a power policy of the foldable electronic device.

Example 3 is the subject matter of Example 2, wherein detecting whether a keyboard is to be used to interface with the foldable electronic device comprises detecting whether the keyboard is a virtual keyboard or a physical keyboard.

Example 4 is the subject matter of Example 2, wherein detecting eye focus of a user comprises detecting one or more of eye movement and a point of gaze of the user.

Example 5 is the subject matter of Example 1, wherein controlling a brightness of an active area on the display comprises dimming a non-focus area of the active area around a focus area of the active area.

Example 6 is the subject matter of Example 5, wherein dimming the non-focus area comprises decreasing a brightness in the non-focus area from a higher brightness at an inner side of the non-focus area adjoining the focus area to a lower brightness at an outer side of the non-focus area.

Example 7 is the subject matter of Example 5, wherein decreasing a brightness in the non-focus area comprises decreasing a brightness of groups of pixels from the inner side to the outer side of the non-focus area.

Example 8 is the subject matter of Example 5, wherein the focus area is in a center of the active area and the non-focus area comprises a first non-focus area on one side of focus area and a second non-focus area on a second side of the focus area opposite the first side.

Example 9 is the subject matter of Example 5, wherein detecting user input to the foldable electronic device comprises detecting eye focus of the user and wherein the method comprises determining a position of the focus area in the active area based on the detected eye focus of the user.

Example 10 is the subject matter of Example 1, wherein detecting a usage mode of a foldable electronic device including a display comprises: detecting whether the foldable electronic device is operating in an unfolded mode; detecting whether the foldable electronic device is operating in a laptop mode; and detecting whether the foldable electronic device is operating in a tent mode.

Example 11 is a non-transitory machine-readable medium storing a program executable by at least one processing unit of an electronic device including a display, the program comprising sets of instructions for: detecting a usage mode of a foldable electronic device including a display; detecting user input to the foldable electronic device; and controlling a brightness of an active area on the display based on the detected usage mode and detected user input.

Example 12 is the subject matter of Example 11, wherein the set of instructions include instructions for detecting user input that further comprise instructions for detecting at least one of: eye focus of a user; a presence of one or more users proximate the foldable electronic device; whether a keyboard is to be used to interface with the foldable electronic device; or a power policy of the foldable electronic device.

Example 13 is the subject matter of Example 12, wherein the set of instructions include instructions for detecting whether a keyboard is to be used that further comprising instructions for detecting whether the keyboard is a virtual keyboard or a physical keyboard.

Example 14 is the subject matter of Example 12, wherein the set of instructions include instructions for detecting eye focus of a user that further comprise instructions for detecting one or more of eye movement and a point of gaze of the user.

Example 15 is the subject matter of Example 11, wherein the set of instructions include instructions for controlling the brightness of an active area on the display that further comprise instructions for dimming a non-focus area of the active area around a focus area of the active area.

Example 16 is A computing device, comprising: one or more processors; a foldable display; and a non-transitory computer-readable medium storing a set of instructions that when executed by at least one processor of the one more processors cause the at least one processor to: detect a usage mode of the foldable electronic device; detect user input to the foldable electronic device; and control a brightness of an active area on the display based on the detected usage mode and detected user input.

Example 17 is the subject matter of Example 16, wherein the set of instructions stored in the non-transitory computer-readable medium include instructions to detect user input that further comprise instructions to detect at least one of: eye focus of a user; presence of one or more users proximate the foldable electronic device; whether a keyboard is to be used to interface with the foldable electronic device; or a power policy of the foldable electronic device.

Example 18 is the subject matter of Example 17, wherein the set of instructions stored in the non-transitory computer-readable medium include instructions to detect whether a keyboard is to be used that further comprise instructions to detect whether the keyboard is a virtual keyboard or a physical keyboard.

Example 19 is the subject matter of Example 17, wherein the set of instructions stored in the non-transitory computer-readable medium include instructions to detect eye focus of a user that further comprise instructions to detect one or more of eye movement and a point of gaze of the user.

Example 20 is the subject matter of Example 16, wherein the set of instructions stored in the non-transitory computer-readable medium include instructions to detect the usage mode that further comprise instructions to: detect whether the foldable electronic device is operating in an unfolded mode; detect whether the foldable electronic device is operating in a laptop mode; and detect whether the foldable electronic device is operating in a tent mode.

The above description illustrates various embodiments of the present disclosure along with examples of how aspects of the particular embodiments may be implemented. The above examples should not be deemed to be the only embodiments and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method, comprising:
    detecting a current usage mode of a foldable electronic device including a first display and a second display that can be unfolded or folded into one of a plurality of usage modes, wherein each of the plurality of usage modes provides a different structural relationship between the first display and the second display;
    determining a focus area on at least one of the first and second displays at least in part based on an eye focus of a user of the foldable electronic device; and
    controlling a brightness of an active area that contains the focus area on at least one of the first and second displays based at least in part on the detected current usage mode of the foldable electronic device,
    wherein controlling the brightness of the active area comprises dimming at least a portion of the active area that is outside of the focus area.

2. The method of claim 1, further comprising detecting user input to the foldable electronic device, including detecting at least one of:
    the eye focus of the user of the foldable electronic device;
    a presence of one or more users proximate the foldable electronic device;
    whether a keyboard is to be used to interface with the foldable electronic device; or
    a power policy of the foldable electronic device;
    wherein controlling the brightness of the active area on the at least one of the first and second displays is further based on the detected user input to the foldable electronic device.

3. The method of claim 2, wherein detecting whether a keyboard is to be used to interface with the foldable electronic device comprises detecting whether the keyboard is a virtual keyboard or a physical keyboard.

4. The method of claim 2, wherein detecting the eye focus of the user comprises detecting one or more of eye movement and a point of gaze of the user.

5. The method of claim 1, wherein controlling the brightness of the active area on the at least one of the first and second displays comprises dimming a non-focus area of the active area around the focus area of the active area.

6. The method of claim 5, wherein dimming the non-focus area comprises decreasing a brightness in the non-focus area from a higher brightness at an inner side of the non-focus area adjoining the focus area to a lower brightness at an outer side of the non-focus area.

7. The method of claim 6, wherein decreasing a brightness in the non-focus area comprises decreasing a brightness of groups of pixels from the inner side to the outer side of the non-focus area.

8. The method of claim 5, wherein the focus area is in a center of the active area and the non-focus area comprises a first non-focus area on one side of focus area and a second non-focus area on a second side of the focus area opposite the first side.

9. The method of claim 5, further comprising detecting user input to the foldable electronic device including detecting the eye focus of the user.

10. The method of claim 1, wherein detecting the current usage mode of the foldable electronic device comprises:
detecting whether the foldable electronic device is currently operating in an unfolded usage mode where the first and second displays are structurally co-planar;
detecting whether the foldable electronic device is currently operating in a folded laptop usage mode, where the first and second displays are non-coplanar angularly facing toward each other; and
detecting whether the foldable electronic device is currently operating in a tent usage mode where the first and second displays are non-coplanar angularly facing away from each other.

11. A non-transitory machine-readable medium storing a program executable by at least one processing unit of a foldable electronic device including a first display and a second display, the program comprising sets of instructions for:
detecting a current usage mode of the foldable electronic device having the first and second displays, the foldable electronic device being unfoldable or foldable into one of a plurality of usage modes, wherein each of the plurality of usage modes provides a different structural relationship between the first display and the second display;
determining a focus area on at least one of the first and second displays at least in part based on an eye focus of a user of the foldable electronic device; and
controlling a brightness of an active area on at least one of the first and second displays based at least in part on the detected current usage mode of the foldable electronic device,
wherein controlling the brightness of the active area comprises dimming at least a portion of the active area that is outside of the focus area.

12. The non-transitory machine-readable medium of claim 11, wherein the set of instructions include instructions for detecting user input to the foldable electronic device, including detecting at least one of:
the eye focus of the user of the foldable electronic device;
a presence of one or more users proximate the foldable electronic device;
whether a keyboard is to be used to interface with the foldable electronic device; or
a power policy of the foldable electronic device;
wherein controlling the brightness of the active area on the at least one of the first and second displays is further based on the detected user input to the foldable electronic device.

13. The non-transitory machine-readable medium of claim 12, wherein the set of instructions that include instructions for detecting whether a keyboard is to be used further comprise instructions for detecting whether the keyboard is a virtual keyboard or a physical keyboard.

14. The non-transitory machine-readable medium of claim 12, wherein the set of instructions that include instructions for detecting the eye focus of the user further comprise instructions for detecting one or more of eye movement and a point of gaze of the user.

15. The non-transitory machine-readable medium of claim 11, wherein the set of instructions that include instructions for controlling the brightness of the active area on the at least one of the first and second displays comprise instructions for dimming a non-focus area of the active area around the focus area of the active area.

16. A foldable computing device, comprising:
one or more processors;
a first display and a second display that can be unfolded from each other or folded towards each other into one of a plurality of usage modes for the foldable computing device, wherein each of the plurality of usage modes provides a different structural relationship between the first display and the second display; and
a non-transitory computer-readable medium storing a set of instructions that when executed by at least one processor of the one more processors cause the at least one processor to:
detect a current usage mode of the foldable computing device;
determine a focus area on at least one of the first and second displays at least in part based on an eye focus of a user of the foldable computing device; and
control a brightness of an active area on at least one of the first and second displays based at least in part on the detected current usage mode of the foldable computing device,
wherein the brightness of the active area is controlled by dimming at least a portion of the active area that is outside of the focus area.

17. The computing device of claim 16, wherein the set of instructions stored in the non-transitory computer-readable medium further include instructions to detect user input to the foldable computing device including detection at least one of:
the eye focus of the user of the foldable computing device;
presence of one or more users proximate the foldable computing device;
whether a keyboard is to be used to interface with the foldable computing device; or
a power policy of the foldable electronic device;
wherein to control the brightness of the active area on the at least one of the first and second displays is further based on the detected user input to the foldable computing device.

18. The computing device of claim 17, wherein the set of instructions stored in the non-transitory computer-readable medium that include instructions to detect whether a keyboard is to be used further comprise instructions to detect whether the keyboard is a virtual keyboard or a physical keyboard.

19. The computing device of claim 17, wherein the set of instructions stored in the non-transitory computer-readable medium that include instructions to detect the eye focus of the user further comprise instructions to detect one or more of eye movement and a point of gaze of the user.

20. The computing device of claim 16, wherein the set of instructions stored in the non-transitory computer-readable medium that include instructions to detect the usage mode further comprise instructions to:
- detect whether the foldable computing device is currently operating in an unfolded usage mode where the first and second displays are structurally co-planar;
- detect whether the foldable computing device is currently operating in a laptop usage mode, where the first and second displays are non-coplanar angularly facing toward each other; and
- detect whether the foldable computing device is currently operating in a tent usage mode where the first and second displays are non-coplanar angularly facing away from each other.

\* \* \* \* \*